April 5, 1966 H. GRÖTTRUP 3,245,036

CHARACTER RECOGNITION BY CONTOUR FOLLOWING

Filed Sept. 27, 1961 8 Sheets-Sheet 1

INVENTOR.
HELMUT GRÖTTRUP

BY Robert Lieber

ATTORNEY

INVENTOR.
HELMUT GRÖTTRUP
BY Robert Lieber
ATTORNEY

CHARACTER RECOGNITION BY CONTOUR FOLLOWING

Filed Sept. 27, 1961 8 Sheets-Sheet 3

INVENTOR.
HELMUT GRÖTTRUP
BY Robert Lieber
ATTORNEY

INVENTOR.
HELMUT GRÖTTRUP
BY Robert Lieber
ATTORNEY

INVENTOR.
HELMUT GRÖTTRUP
BY Robert Liebe
ATTORNEY

INVENTOR.
HELMUT GRÖTTRUP
BY Robert Lieber
ATTORNEY

INVENTOR.
HELMUT GRÖTTRUP
BY [signature]
ATTORNEY

INVENTOR.
HELMUT GRÖTTRUP
BY Robert Lieber
ATTORNEY

United States Patent Office 3,245,036
Patented Apr. 5, 1966

3,245,036
CHARACTER RECOGNITION BY CONTOUR FOLLOWING

Helmut Gröttrup, Pforzheim, Germany, assignor to International Standard Electric Corporation, New York, N.Y., a corporation of Delaware
Filed Sept. 27, 1961, Ser. No. 141,198
Claims priority, application Germany, Oct. 5, 1960, St 16,975
20 Claims. (Cl. 340—146.3)

This invention relates to apparatus for performing the automatic scanning and recognition of characters, in particular of printed characters.

In the course of introducing automation to computing and other processes, it is often also desirable for visually readable characters to be read directly automatically, in order thereby to control arrangements in data-processing systems. This desire has led to a great number of well-known proposals for the automatic reading of letters and numerals.

In some of the known systems, the characters are photoelectrically scanned along certain horizontal and/or vertical lines, and the black-white transitions are determined. When suitably selecting the scanning lines, it is thus possible to obtain a criteria for the individual characters, representing a certain code of the respective characters. Instead of the optical scanning, it has also already been proposed to print the characters with an electrically conducting or magnetic ink, and to carry out the scanning along certain lines with the aid of corresponding sensing devices.

In this type of character-recognition system, a code is obtained which is completely arbitrary and, therefore, is generally also insufficiently surveyable. In particular, however, that the black-white transitions are bound to exactly defined points within the scanning field is a disadvantage. A more or less large deviation, therefore, may lead either to a faulty recognition, or may completely impossible for any recognition. Such deviations, however, are easily possible, especially in the case of characters printed by a typewriter, because the types are very often soiled (blurred). An unambiguous recognition is therefore not always reliably safeguarded.

In order to avoid these disadvantages, several other scanning systems have already been proposed. One of these conventional proposals suggests the scanning of the lines of the characters, and the utilization of changing electric currents or voltages in accordance with the shape of the characters, for characterising the scanned character. Another well-known proposal suggests the imaging of the characters on a plate of insulating material provided with photosensitive resistors, and checking the respective conductance or resistance values of these resistors. For enabling an unambiguous recognition, these so-called light probes are accommodated in a suitable form and arrangement in the imaging field. Finally, it is also possible to do without the light probes, if these light probes are regarded as imaginary tracks, and if the scanning beam is guided on these tracks. Accordingly, the last mentioned system is also bound to cause the appearance of the black-white transitions.

The invention is based on the problem of providing a scanning system, especially a system comprising photoelectrically scanning and evaluating the characters, which is independent of the black-white transitions, in that the contours of the characters are scanned, but in which the evaluation is performed in a fundamentally different way than in the above mentioned known type of arrangement employing the scanning of contours.

According to the invention the scanning device is guided from a fixed starting point on the character, along the contours of the characters, i.e. in such a way that, upon reaching one end of a line or bend or branching or crossing (branching point of the first, second, third or fourth order), the scanning device performs a scanning of the next shape element (shape element=line extending between two branching points) in accordance with a previously determined selectable order of succession, until the entire character has been scanned, and that in the course of the scanning operation currents or voltages are produced indicating the order of the branching point, the direction at the beginning of each shape element with respect to a predetermined coordinate system, as well as the bend of the shape elements, and that at least two of these criteria are utilized for identifying the scanned character.

The order of succession in scanning the individual shape elements, as such, is actually of no importance in the course of recognizing the characters within the scope of the invention, but some way of fixing has to be agreed upon, for example, that upon reaching a branching point the scanning operation is continued with that particular shape element which, in a mathematically positive sense of rotation, is nearest to the path on which the scanning device has come into the branching point. Furthermore, it is appropriate to digitalize the resulting currents or voltages, in other words, to assign to each criterion some discrete voltage or current values, so that the individual criteria can be determined with the aid of a small number of numerals.

For scanning the lines, a rotational movement is superimposed upon the scanning beam, i.e. the radius of the circle is automatically adapted to the thickness of the lines of the character. In the case of a movement between two characters, it is appropriate to choose a predetermined radius which is smaller than the radius to be expected during the scanning of a character.

In the following, the invention will now be described in detail with reference to FIGS. 1–22 of the accompanying drawings, in which.

Figure 1:
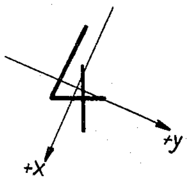
FIG. 1 shows the numeral "4" with an oblique system of coordinates.

In the present example it is assumed that the scanning of the characters is based on an oblique system of coordinates, as shown in FIG. 1. This is appropriate above all in order that the assignment of the quadrants becomes unambiguous, and that each time the $y$-coordinate happens to coincide with the direction of the line, only one point of the character will appear with a maximum or minimum $x$-coordinate. With respect to the scanning beam which is freely movable between two characters, it is assumed that the beam is advanced in the direction of the positive $y$-axis, that is, from left to right. When the scanning beam meets a new character, the rule is that the beam is first moved in a manner to be described to the branching point having the greatest positive $x$-coordinate. This point is regarded as the initial point for performing the actual scanning and evaluation process. From this starting point the scanning beam is led along the line pattern until it reaches the next branching point; thereupon that particular shape element is scanned which is reached first by the scanning beam, providing that the scanning beam is moved around the branching point in the anticlock-wise direction.

Figure 2:
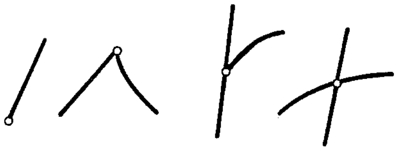
FIG. 2 shows four different kinds of branching points that are possible with respect to the numerals 0 . . . 9.

FIG. 2 shows the possible branching points in the case of numerals and letters; these branching points are (a) the ends of lines (first order), (b) the bends in the lines (second order), as well as (c) the branchings of lines (third order), and (d) the crossings of lines (fourth order). Quite depending on the number of outlets, the branching point is referred to as being either one of the first, second, third, or fourth order.

Figure 3:
FIG. 3 shows three different branching points with the path of the scanning beam denoted by dashlines.

The dashlines in FIG. 3 show the path of a scanning beam adapted to perform the scanning of three different parts of a character, each with a branching point of a different order, whenever the scanning beam is guided in accordance with the above specifications.

Figure 4:
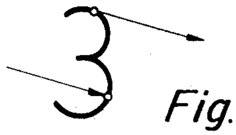
FIG. 4 shows the numeral "3" with an incoming and outgoing scanning beam.

After the scanning beam has scanned the character once or several times, the beam leaves the character at the so-called jumping-off point, with respect to which the rule has been laid down that this point shall be a branching point of the character having a maximum negative $x$-coordinate, or any other suitable point. FIG. 4 shows the point of impingement (not the starting point of the scanning), and the jumping-off point of the scanning beam with respect to the numeral "3" to be read.

The line patterns of a character which are limited by two branching points, are referred to as "shape elements." It is now possible for the characters to be unambiguously characterised by both the shape elements and the branching points; as a first characterising feature, the particular order of the branching point at the beginning of a shape element is utilized. As may be taken from FIG. 2, there are four different possibilities, so that this characterising feature can be represented in digital fashion by the numerals 1 through 4. As the second characterising feature, the starting direction of the respective shape element may be utilized, i.e. by determining into which one of the quadrants of the coordinate system the shape element will extend when imagining the origin of the coordinate system to be positioned at the branching point. Since the coordinate system comprises four quadrants, this characterising feature can also be represented in digital form by the numerals 1–4.

Since for the purpose of providing these two characterising features, the beginning of the respective shape element is used, the third characterising feature is provided by the kind of curvature of the respective shape element. Since the shape element can be bent positively, negatively, or alternatingly, this characterising feature can likewise be determined unambiguously by the numerals 1–4.

Now each time one of the three character identifications can be assigned to one point within the decadic number system, and each shape element can be represented in accordance with these three criteria by a three-digit number, whereby each of the positions can be occupied by one of the numerals 1 to 4. Accordingly, for the automatic evaluation of the characters, only the digitalized currents or voltages have to be ascertained which are assigned to the individual digits of the three different character identifications. Since each of these criteria can only assume four different values, the digital statements can be represented by respectively two bits.

Figure 5:
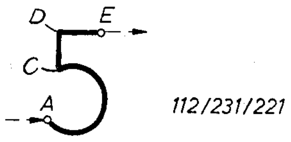
FIG. 5 shows the numeral "5" with the resulting three digitalized criteria.

Accordingly, each character is determined by several three-position (three-digit) numbers which correspond to the successively scanned shape elements. FIG 5 shows the three 3-digit numbers resulting in the course of scanning the numeral 5 after one single passage. The point A is regarded as the initial or starting point and the point E as the jumping-off point. The first digit from the left of each of the triple (3-digit) numbers indicates the order of the respective point; the second digit indicates the initial direction of the respective shape element; and the third digit indicates the curvature, i.e. the first-position digit is determined by the order of the branching point, the second-position digit is determined by the quadrant into which the shape element extends, and the following applies to the third-position digit: 1=not bent, 2=positive, 3=negative, 4=alternatingly bent.

In some cases the characters may also be determined by the first two character identifications (criteria), that is, by desisting from the curvature criterion, or by the first and the third one.

Figure 6:
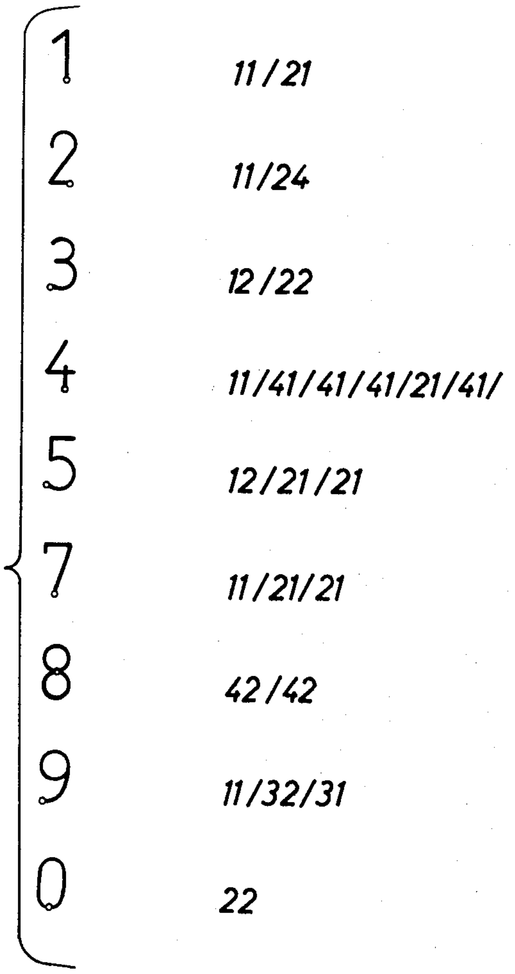
FIG. 6 shows the numerals 0 . . . 9 with only two criteria per shape element.

FIG. 6 shows the numerals 0 . . . 9 with only two criteria per shape element, namely with the order of the branching points (first position) and the curvature of the shape elements (second position). In this case it is assumed that the scanning is fundamentally started at a branching point of the first order with a maximum positive $x$-coordinate. If no branching point of the first order is available, then, as is the case with the numerals "8", another branching point will have to be taken. If no branching point is available at all, as is the case with the numeral "0," then the point of the character with the maximum positive $x$-coordinate is taken as the starting point. Accordingly, as shown in FIG. 6, the ten numerals can be determined unambiguously by the order of the branching points and by the respective curvatures. In order to distinguish between the numerals "7" and the numeral "1," the first one either has to be provided with a small cross-like (serif), or the upper cross-line of the latter has to be provided with a small downstroke.

For ascertaining the three character indentifications (criteria), some circuit arrangements have been provided which will be described hereinafter with reference to FIGS. 7 through 22.

For the scanning purpose, a cathode-ray tube 1 is used whose scanning beam is projected with the aid of suitable optical means 2, upon the document (record means) 3 to be scanned. The brightness, as reflected by the document, is received by the photoelectric cell 4, and is evaluated in a subsequently arranged circuit. Two voltages are applied to the pairs of deflecting plates 4 and 5 of the cathode-ray tube which are superimposed upon one another, namely the scanning voltage which causes the beam to follow the contour of the character two being scanned, and the rotation voltage which causes the beam at the same time to move in a small circle. The scanning voltage is a slowly variable voltage which is varied by certain small amounts in a step-by-step manner in a timely rhythm, as will be described hereinafter.

With respect to the two reflecting systems in the *x*- and *y*-direction, a storage capacitor 45/1 and a storage capacitor 45/2 are respectively provided. These serve to store the last-valid values of the scanning voltage in a manner to be described.

Figure 8:
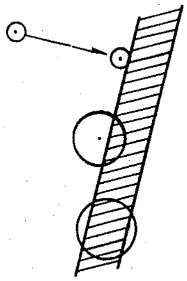
FIG. 8 shows the scanning beam as impinging upon a character.

In both directions of deflection, the rotation voltage, that is, A.C. voltages of the same amplitude, but with a phase shifted by 90°, is superimposed upon the scanning voltages, for causing the scanning point to describe a small circle whose radius is dependent upon the amplitude of the superimposed rotation voltage, and the central point of which is determined by the two values of the scanning voltages. The superposition is effected by capacitive elements 80. The amplitudes of the rotation voltage are so adjusted that the scanning point will describe a circle between two characters, the diameter of the said circle being smaller than the minimum thickness of the lines of the characters to be scanned. By being advanced in a step-by-step manner, whereby each step corresponds to the size of the scanning radius, the scanning circle is automatically widened as the scanning beam meets upon a character; that is, the radius is enlarged. FIG. 8 shows the scanning beam as impinging upon a character, as well as the widened scanning-beam circle after the performance of two steps. Since the size of the radius only depends on the amplitudes of the rotation voltage, only the amplitudes thereof have to be adjusted correspondingly. This can be achieved by controlling the gain factor of the amplifiers 8 and 9 that are respectively arranged subsequently to the sine- and cosine-generator 6 and 7. The first impulse, produced after the scanning beam has impinged upon a character, is used for releasing the amplitude control.

Both the brightness received by the photocell 4 and, consequently, the output current are constant when the scanning beam is positioned between two characters. However, due to the circular movement of the beam, bright and dark pulses will appear alternately at the output of the photocell, if the scanning beam meets upon a character. These variations are converted into a rectangular voltage in the limiter 10 which is arranged subsequently to the photocell 4. Thereupon the D.C. component of the thus resulting rectangular alternating current is detected by the rectifier or filter 11. As may be taken from FIG. 9, the D.C. component of this alternating current depends on the time durations of the bright and dark pulses, that is, also on the ratio of the radius of the scanning circle to the width of the lines of the scanned character.

Figure 9:
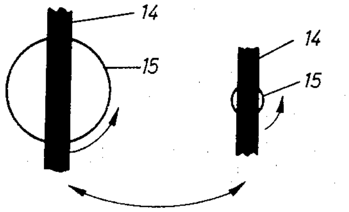
FIG. 9 shows two sections of a character with scanning circles having different diameters.

FIG. 9 shows two sections or parts of a character 14, in which the scanning circle 15 has different radii. Accordingly, also the relationship between the bright and the dark time is different. The direct-current component as ascertained by the direct-current filter 11, is used for controlling the amplitudes of the rotation voltage. This amplitude is controlled in such a way that the direct-current component proceeds towards zero. After the rectangular alternating current has become symmetrical, hence, after the direct-current component has become zero, the zero indicator 12, which is likewise arranged in the output line of the photocell, disconnects the amplitude control by the opening of switch 13, so that the amplitude of the rotation voltage, that is, the radius of the scanning circle, will now remain constant.

The means necessary for effecting the amplitude control (limiter 10, direct-current filter 11 and zero indicator 12) are well-known to the person skilled in the art and, therefore, do not need to be explained in detail herein.

Upon completion of the amplitude control, the scanning beam is advanced by one step which corresponds to the size of the radius of the scanning circle, i.e. in the *y*-direction. In this way the centre of the scanning circle approximately approaches the centre of the part of the character which may be either of the straight-lined or bent type. In the course of the following scanning operation the scanning beam is respectively moved along the character line in a step-by-step manner, and each step is respectively equal to the radius of the scanning circle.

With respect to the setting of the scanning circle it is not absolutely necessary for the bright value and the dark value of the resulting rectangular alternating current to behave like being in the ratio of 1:1 as is the case in the final condition of the present example, but it is possible to provide any other suitable relationship. Before proceeding with the further explanation of the novel method, it seems appropriate first to describe the way of ascertaining the individual criteria.

I. DETECTING THE CRITERIA OF A SHAPE ELEMENT

As already mentioned hereinbefore, a shape element is determined by the order of the branching point, by the direction at the beginning of the shape element, and by the curvature. It is now the problem to ascertain these three criteria.

(*1*) *Ascertaining the order of a branching point*

Before examining the particular part of the character just under consideration with the aim of finding a branching point, determination has to be made in the course of each scanning step whether the scanning beam is moving along a non-branched part of the character. In the course of this, and for the purpose of distinguishing between a branching point of the second order (bent) and a non-branched point, a limiting line has to be drawn, because the transition between these two kinds of scanning points is not a continuous one.

For determining a non-branched point, the symmetry or the non-symmetry of the two dark pulses in the course of one circular rotation of the scanning beam may be used. In the case of a non-branched point on a straight-lined shape element, the two dark pulses are lying completely symmetrical, and in the case of a bent shape element these pulses are approximately symmetrical, whereas in the case of a branching point of the second order the two dark pulses are lying asymmetrically.

Figure 10:
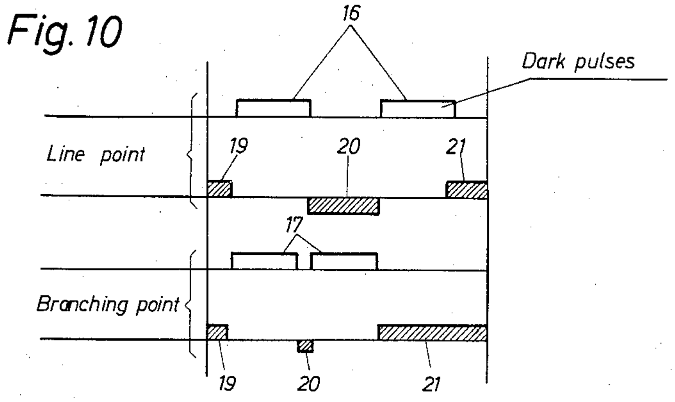
FIG. 10 is a schematic representation relating to the comparison of the dark pulses in case of a line point and a branching point of the second order.

FIG. 10 schematically shows the resulting dark pulses 16 and 17 at both a normal point and a branching point of the second order. The two dark pulses themselves, which correspond to the lines of the scanned character, generally have the same length. Accordingly, the asymmetry is to be found with the bright (light) pulses. For this reason a suitable circuit arrangement 18 is connected to the output of the photocell 4. This circuit serves to convert the first light pulse into a positive electrical pulse (19), the second light pulse into a negative electrical pulse (20), and the third light pulse again into a positive electrical pulse (21). Such a circuit may be a bi-stable flip-flop circuit which will shift its condition with each bright pulse. To the circuit arrangement 18 a limiter 22 is connected, as well as a rectifier 23, so that the asymmetry can be represented and measured by the direct-current component of the thus resulting rectangular alternating current, at the output 24. For the evaluating purpose, it is appropriate to use a greater number of rotations instead of only one rotation of the scanning circle.

Figure 11:
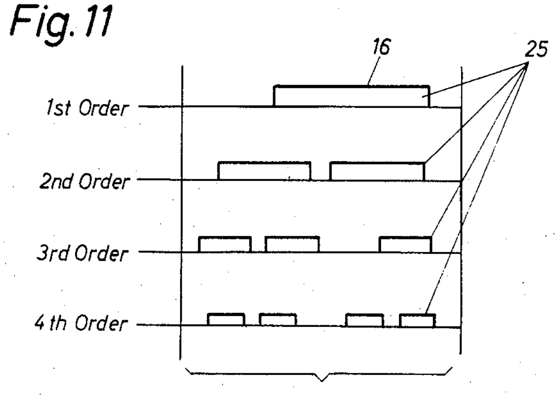
FIG. 11 shows the dark pulses resulting at the different types of branching points, in schematic form.

When the output 24 indicates that the point under consideration is not a non-branched point then a new shape element is started which calls for the determination of the order of the respective branching point. This determination, however, can be made in a relatively simple way. As may be seen from FIG. 11, it is only necessary to count the number of dark pulses at the output of the photocell during one circular rotation of the scanning beam. In order to overcome the difficulties which are based on the time limitation with respect to the counting, it is also appropriate in this case to include the number of dark pulses appearing during a greater number of rotations. In FIG. 11 the resulting dark pulses 25 are shown in schematic form. In the case of a branching point of a first order (top row), that is, at the end of a line pattern, one single dark pulse is produced, whereas in the case of a branching point of the second order (second row), two dark pulses will appear, etc. (cf. FIG. 2). At the output of the photocell, a counting circuit 26 is arranged to this end, delivering the counting results from the photocell if, in conjunction with the circuit arrangement 23, the described asymmetry has been established. In other words, when the circuit 23 detects asymmetry of the dark pulses, the counting circuit 26 will be enabled.

(2) *Ascertaining the new stepping direction*

Upon reaching a branching point, that is, at the beginning of a new shape element, it is first necessary to determine the direction of the next step of the scanning beam. However, since fundamentally the setting direction has to be determined at each step of the scanning beam, in order that the scanning beam is also really led along the character, and in order that this direction determination can also be employed in the case of a branching point, the description will be directed first to the general case of the direction determination.

Figure 12:
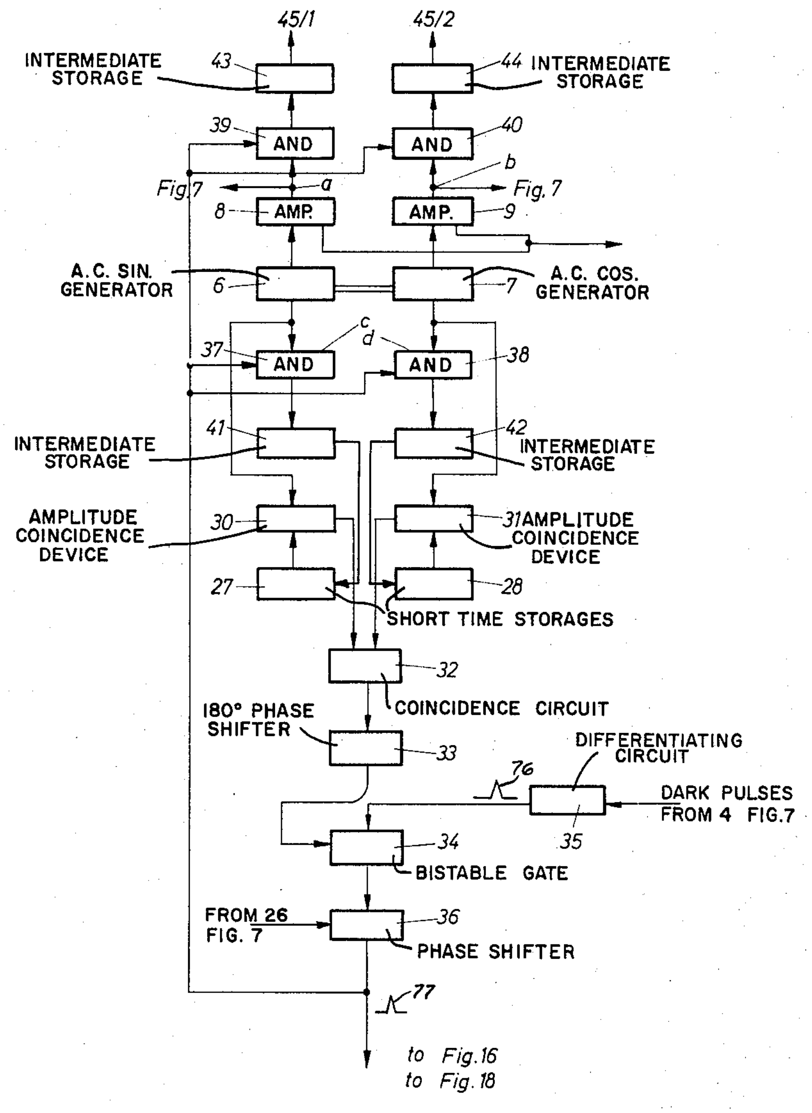
FIG. 12 shows a block diagram of the circuit arrangement for determining the stepping direction of the scanning beam.

FIG. 12 shows a circuit arrangement in schematic form, with the aid of which it is possible to determine the new stepping direction. This circuit arrangement contains the sine- and cosine-generators 6 and 7, as already shown in FIG. 7, as well as the two subsequently arranged amplifiers 8 and 9.

In order to ensure that the scanning beam is led along the character in accordance with the above rule, the new stepping of the scanning beam has to be effected in a direction which is as closely as possible related to the direction of origin of the scanning beam during the preceding step in a mathematically positive sense of rotation.

To this end the old direction is stored each time in the short-time storages 27 and 28. These storages contain the sine- and cosine-values which correspond to the direction of the last step, as provided by the two generators 6 and 7. The stepping direction of the scanning beam is defined by the sine- and cosine-value of the superimposed rotation voltage at the moment of passing over the part of the character, because the beam, at each step, passes through a circular track (see FIG. 13).

Figure 13:
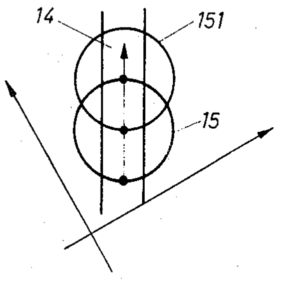
FIG. 13 is a sketch for explaining the mode of operation of the circuit arrangement according to FIG 12.

For the sake of simplicity the part of the character 14 is assumed to be a straight line (see FIG. 13).

During the rotation preceding the rotation 15 two dark pulses were produced, one of which is chosen as being decisive for the stepping direction, i.e. the one corresponding to the direction "upwards," on account of processes to be described hereinafter. The sine- and cosine-values pertaining to this direction are likewise stored into the short-time storages 27 and 28 after the performance of processes likewise to be described hereinafter, and are thereupon stored into the intermediate storages 43 and 44 by being provided with the correct amplitude. Accordingly, these sine- and cosine-values have caused the scanning point to move to the circle 15. Now the problem has to be solved of ascertaining both the direction and the size of the next step, in order to bring the scanning circle on to the new track 151.

After the scanning circle 15 has reached the correct diameter on account of the method or process described hereinbefore, the dark pulses 16 are produced, as shown in the top part of FIG. 10; these pulses are symmetrical in this case, because the portion of line 14 is a straight one. These dark pulses are fed to the differentiating circuit 35 which causes the production of needle pulses 75 (shown in FIG. 15), corresponding to the leading edge of the dark pulses. These needle pulses are fed to a gating circuit 34.

Figure 15:
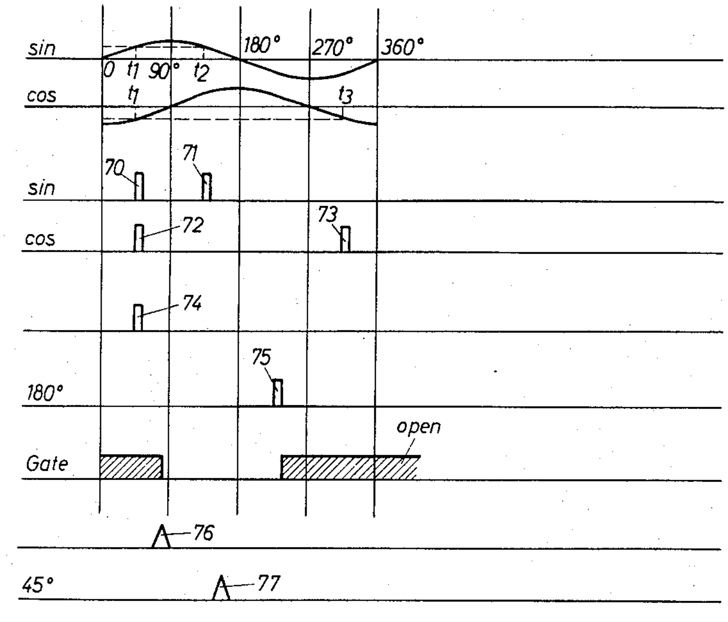
FIG. 15 shows diagrams of the time relationship for explaining the mode of operation of the circuit arrangement according to FIG. 12.

The gating circuit 34 is controlled by pulses that are produced in the following way: As already mentioned hereinbefore, the sine- and cosine-values are stored in the short-time storages 27 and 28 which correspond to the direction of the step by which the scanning point has been brought to the circle 15. The amplitudes of these values are compared to the continuously oscillating values of the generators 6 and 7 in the amplitude-coincidence devices 30 and 31 and, in the case of an equality of these amplitudes, produce short pulses 70, 71, 72, 73, as shown in FIG. 15.

Supposing now that the sine- or cosine-values corresponding to the old direction, amount to *a* and *b* respectively. During comparison of these stored values with the voltage values produced by the two generators 6 and 7 a coincidence with respect to the sine-value will appear at the time positions $t_1$ and $t_2$, and with respect to the cosine-value at the time positions $t_1$ and $t_3$. This coincidence is ascertained by the coincidence circuit 30 or 31. At the outputs thereof the pulses 70–73 are produced at the time positions $t_1$, $t_2$ and $t_3$, as is shown in the third and fourth line.

In order to avoid ambiguity, the pulses 70 through 73 are fed to a coincidence circuit 32 which only delivers a pulse 74 if one of the pulses 70 are 71, with respect to time, coincides with one of the pulses 72 or 73. Accordingly, this pulse 74 always appears when the scanning beam has reached that point of the rotation circle whose connection with the central point of the rotation circle 15 corresponds to the direction of the step by which the scanning point has been led to the rotation circle 15.

This pulse is shifted by 180° in a phase shifter 33, and now indicates the direction of origin of the scanning beam. This pulse 75 is used for unblocking the gate 34, as is also shown in FIG. 15. Having been opened, the gate will remain open on its own. This gate may be bistable flip-flop which is shifted to one condition by the pulse 75 and to the other conditon by the needle pulse 76. The needle pulse 76, however, passes through it before it is shifted.

Figure 14:
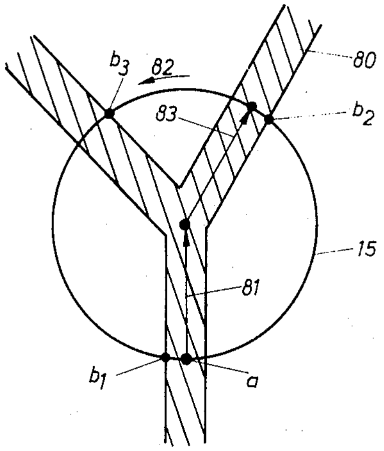
FIG. 14 is a sketch for explaining the determination of the next central point of the scanning circle.

The gate is reblocked upon passing of the needle pulse 76 through the gate 34. In this way it is ensured that only such types of needle pulses pass through the gate. FIG. 14 is supposed to point out clearly which needle pulse 76 will be permitted to pass through the gate 34, in case several pulses are produced by the photocell 4 via the differentiating circuit 35. For this purpose the processes from FIG. 14 have again been plotted in polar coordinates. As part of the character, a branching of the third order 80 has been assumed. The arrow 81 indicates the last step of the centre point of the scanning circle. At the present time the scanning beam is moved on the scanning circle 15 in the direction, as indicated by the arrow 82. The gate 34 is unblocked by the pulse 75, so that the gate is opened from point *a* of the scanning circle 15 onwards. Needle pulses 76 are produced via the differentiating circuit 35 at the points $b_1$, $b_2$ and $b_3$ of the scanning circle by the front edges of the lines of which the branch 80 is composed. Only the needle pulse which is the first one to pass through in the direction of origin, hence the one produced at the point ("at the time position") $b_2$ will be permitted to pass through the gate. This needle pulse 76 is in accordance with the rule as laid down hereinbefore, saying that the scanning is continued with that particular shape element which, in the mathematically positive sense of rotation, is closest to the path on which the beam has entered the branching point.

The needle pulse which has passed through the gate 34, is displaced by a certain angular amount in a phase shifter 36. This displacement serves the purpose of changing the pulse 76 which originated from the front edge of the line forming part of the character, into a pulse 77 which appears whenever the scanning point exceeds the centre of the line forming part of the character. The angle of displacement which is required to this end amounts to 90, 45, 30 or 22.5 degrees respectively, if the part of the character represents a branching of the zeroth, first, second or third order. For this reason the evaluation results of the counting circuit 26 is utilized for setting the phase shifter 36.

The pulse 77, as emitted by the phase shifter 36, is first fed to the gates 37 and 38, to which are applied the voltages of the generators 6 and 7. In this way the gates are momentarily unblocked and permit a "momentary amplitude" of the generators to be admitted to the intermediate storages 41 and 42, so that the new direction of the partial character is stored in these storages.

In a similar way the gates 39 and 40 are unblocked, and permit two momentary voltage values to be admitted to the intermediate storages 43 and 44. These voltage values are produced by the amplifiers 8 and 9 from the voltage values of the generators 6 and 7. Output values of the amplifiers 8 and 9 serve to define the scanning circle 15, as may be taken from FIG. 7. The momentary values as cut out by the gates, correspond to the vector 83 of FIG. 14 extending from the centre of the scanning circle to the point of the periphery which, in the future stepping direction, is lying in the centre of the partial character 80; in other words: they correspond to the next step.

The storing of these voltage values has served to prepare the next step. If, at the beginning of the scanning of a shape element, the digital values relating to both the order of the branching (according to FIG. 11) and the direction (according to FIGS. 16, 17) have been stored, and if, in addition thereto, at a suitable position of the scanning circle, the storing has been performed of the curvature criterion according to FIG. 18, it is possible to perform the next step. To this end, the storages 27 and 28 are erased with the aid of means not shown, the values are transferred from 41 and 42 to 27 and 28, and the value of the storages 43 and 44 are transferred to the scanning storages 45/1 and 45/2, i.e. added to the already existing voltages. On account of this the scanning point is moved on the circle 151 (FIG. 13) about the displaced central point.

If the radius of the scanning circle is not adjusted to a light/dark ratio of 1:1, as assumed in the present example, but to any other light/dark ratio, then also the stated angular values are changed correspondingly.

*(3) Determination of the direction of a shape element*

Figure 16:
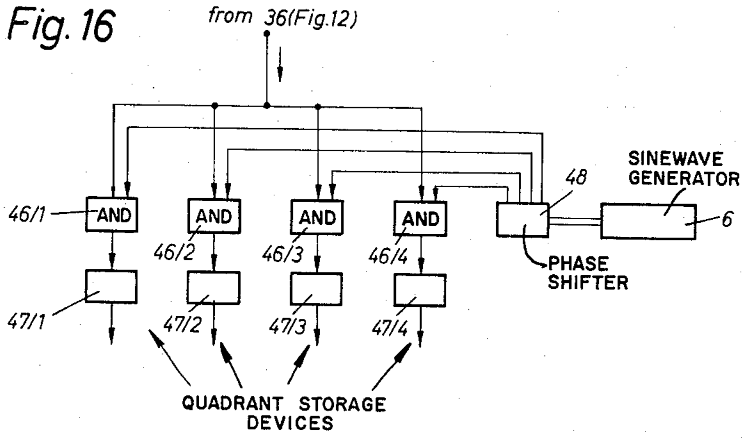
FIG. 16 shows a block diagram of an arrangement adapted to determine the intial direction of a shape element.

The initial direction of a shape element can be determined in a relatively simple way with the aid of the circuit arrangement shown in FIG. 16. To each quadrant of the coordinate system, a gate 46 and a subsequently arranged storage 47 is assigned. The output pulse, as coming from the phase shifter 36, is applied to the four gates 46. The secondary inputs of the gates 46 are connected respectively via the phase shifter 48, to the sine wave generator 6. The gating circuits are designed in such a way that one of the gates is opened or unblocked each time one of the four quadrants is being passed through. In this way the output pulse of the phase shifter 36 is only permitted to pass through one of the four gates 46, and is stored in the associated storage device. It is advisable to repeat this storing several times, and to determine with the aid of a suitable comparator, whether the result remains the same after several repetitions. A different result may be obtained if the output of the phase shifter 36 just happens to fall within the period of time required to perform the switching-over from one gate to another, that is, on to the border between two quadrants. In order to avoid faulty indications, the phase shifter 48 has been provided, with the aid of which the output voltage of the sinewave generator 6 can be shifted by a fixed auxiliary phase.

Figure 17:
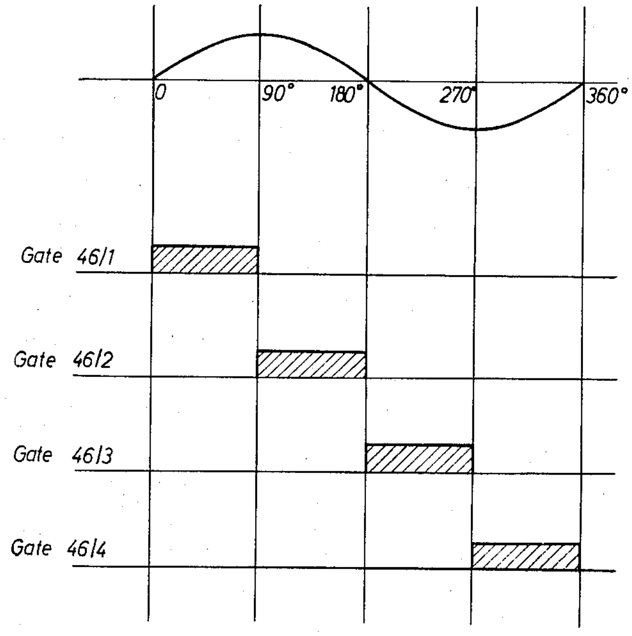
FIG. 17 shows diagrams for explaining the mode of operation of the direction-determining gates.

The mode of operation of the gates 46 is shown in FIG. 17 by way of a graphic representation. The sine wave generator 6, in the course of one circular rotation of the scanning point, produces the sinusoidal voltage, as shown in the top line. Each of the four gates 46 is unblocked for 90°, that is, for the time required to pass through one quadrant.

*(4) Determination of the curvature of a shape element*

Figure 18:
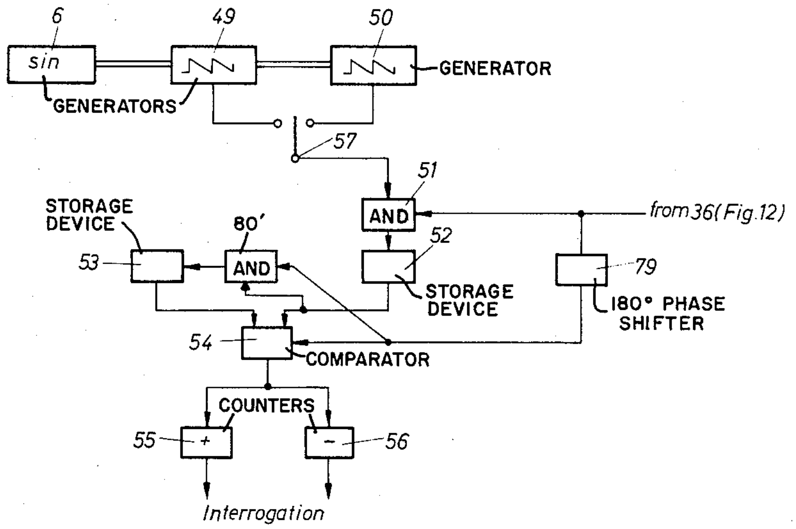
FIG. 18 shows a block diagram of an arrangement adapted to determine the curvature of a line pattern.

Circuit arrangements have likewise become known which serve to determine the curvature of a line pattern. One type of circuit arrangement suitable to this end is shown in FIG. 18 in schematic form. The sine wave generator 6 controls two sawtooth generators 49 and 50, i.e. in such a way that they each produce one sawtooth pulse during one circular rotation of the scanning point. The two sawtooth pulses of the generators 49 and 50 are separated in phase by 180°. Accordingly, the voltage of the sawtooth generators is a direct measurement for the angle which is described by the scanning point in the course of its circular path.

Normally the switch 57 is switched in such a way that the generator 50 is switched off. The output pulses of the phase shifter 36 is applied to the gate 51, and thus effects the momentary voltage of the sawtooth generators to be stored into the storage device 52 at the time position in which the scanning point has the new direction. Between the arrival of two pulses from 36 the comparator 54 is controlled by the pulse which is shifted by about 180° by the action of the phase shifter 79. By this comparator 54 the value, as just stored in the storage device 52, is compared to the value stored previously in the storage device 53. The result of the comparison is either a positive or negative voltage pulse, or else, in the case of a very slight difference, a value which is suppressed by the comparator 54. This pulse is stored in one of the two counters (storages) 55 or 56. Through the gate 80' the pulse, as arriving from the phase shifter 79, causes, with a certain time delay, the restoring or transfer of the stored information from the storage device 52 to the storage device 53; the latter having been erased prior thereto. The storage device 53 is then ready for comparison with the value in the auxiliary storage device 52 as a result of the next pulse 77.

With the aid of the comparator 54 it is possible to obtain three different results. If the value stored in the auxiliary storage device 53 is in agreement with the momentary value of the sawtooth generators, then no output signal will appear at the comparator 54. However, if the voltage stored in the storage device 53, is either smaller or greater than the voltage of the new step, then an output signal is applied either to the output storage device 55 or to the output storage device 56. Since the voltage values are a measurement for the angle that has been passed through, the storage device 55 provides a statement indicating that the curvature is positive, and the storage device 56 provides a statement indicating that the curvature is negative. If, in the course of the scanning operation, both storages 55 and 56 are occupied, then this means to imply that the curvature is of the changing type. If, however, neither of these two storages is occupied, then the curvature is "zero." Accordingly, the condition or state of these two storages provides a digital representation of the curvature identification (criterion).

The sawtooth generator 50, whose sawtooth voltage is displaced by 180° with respect to that of the sawtooth generator 49, is switched-on by the action of switch 57 if the angular values are near the edge of the sawtooth voltage produced by the generator 49, in order thus to avoid possible ambiguities. Otherwise this generator operates in exactly the same way as the sawtooth generator 49.

Figure 19:
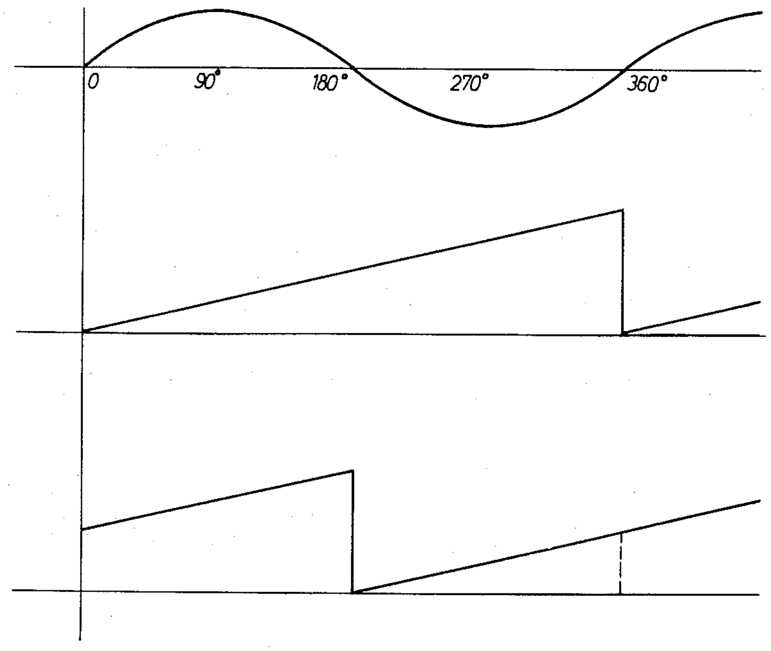
FIG. 19 shows diagrams for explaining the showing of FIG. 17.

The mode of operation of the two sawtooth generators 49 and 50 may be taken from the graphical representation given in FIG. 19. In the course of one complete sinusoidal oscillation from the generator 6, both of the sawtooth generators produce sawtooth pulses which, however, are displaced by 180° with respect to one another.

II. SCANNING AND EVALUATION

After having explained the individual circuit arrangements which are necessary for effecting the scanning operation, a description of the scanning and evaluation in general will not follow.

When the scanning beam has reached a new character, and when the scanning circle is set in the manner, as described hereinbefore, it is first necessary to ascertain the defined starting point of the scanning operation, in order to perform the character recognition. That particular point of the character having the greatest positive $x$-coordinate is assumed to the starting point; and the point having the greatest negative $x$-coordinate is assumed to be the jumping-off point. Thus, it is necessary to lead the scanning beam once or several times over the character in the way described hereinbefore, and to ascertain, in the course of this, the greatest $x$-values of both signs. For this purpose it is sufficient each time to use one maximum and one minimum storage device which devices are connected to the storage device for scanning the $x$-coordinate.

Figures 20, 21:
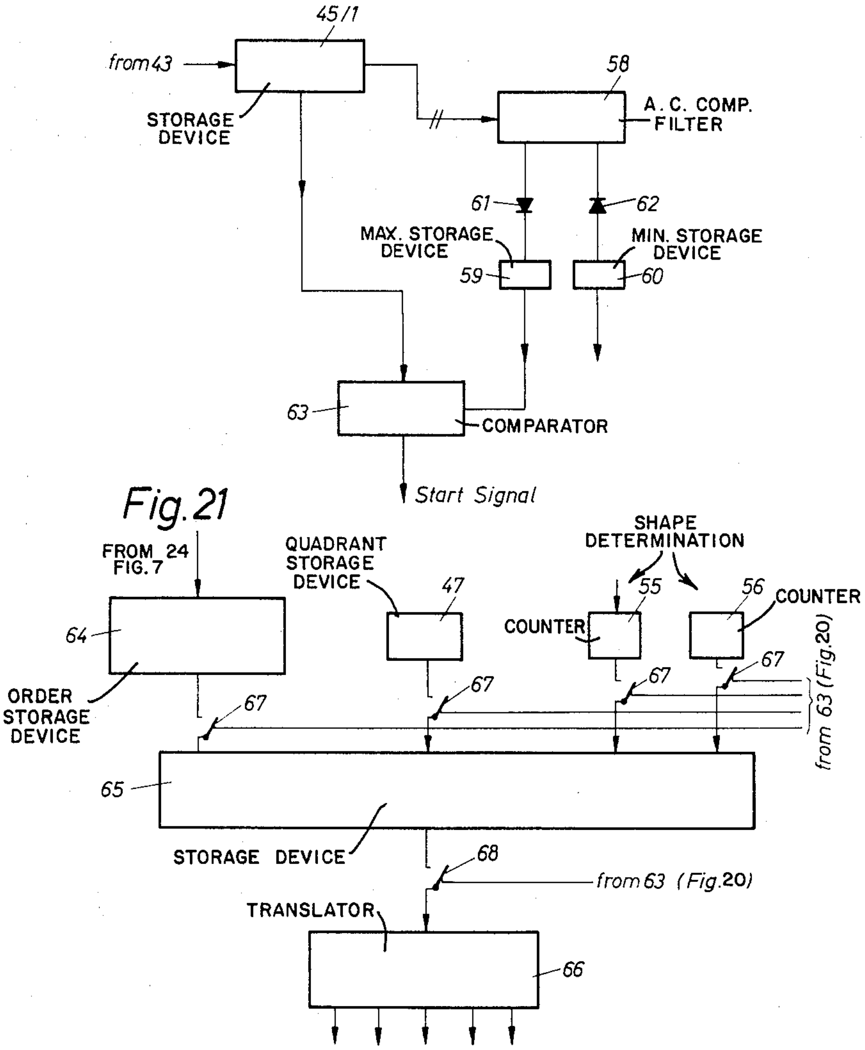
FIG. 20 shows in schematic form a circuit arrangement adapted to determine both the intial and the end point of the scanning.
FIG. 21 shows the evaluating arrangement in schematic form.
Figure 22:
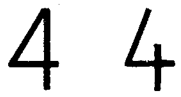
FIG. 22 shows two ways of printing the numeral "4."

A circuit arrangement which is suitable to this end is shown in FIG. 20 in schematic form. The changing alternating-current component of the storage device for scanning the $x$-coordinate 45/1 is filtered out by the filter 58 during the scanning of the character. This filter 58 is connected to the maximum storage device 59 and to the minimum storage device 60 via oppositely polarized rectifiers 61 or 62, in which storage devices the setting of the two extreme values of the $x$-coordinate is effected.

After the extreme values have been ascertained, the scanning beam is lead along the character until the scanning voltage in the $x$-direction is in agreement with the stored value. To this end, the comparator 63 is utilized whose output signal, in the case of an equality of the two input voltages, serves as a starting signal (start signal), i.e. for starting the character recognition. This indicates the beginning of the storing of the shape element criteria ascertained from this time position onwards.

As the starting point for the scanning operation, the branching point of the first order with the greatest positive $x$-coordinate may be used. In this case, whether there are any branching points must first be determined. If there are no branching points, then the point of the character having the greatest positive $x$-coordinate will again serve as the starting point. If the character has one branching point only, then this point is taken as the starting point. If there are several branching points of the first order, then the branching point with the greatest positive $x$-coordinate has to be ascertained. If no branching points of the first order are available, one may proceed to the branching points of the second, third, or fourth order.

The redundancy in determination appearing on account of a repeated passing-over the same shape elements in the case of complicated letters, or as a result of a repeated encircling or sweeping of simple types of characters, can be reduced with the aid of simple types of logic circuits. Since all of the single-valued (monovalent) branching points are points of reversal, the criteria of the shape elements after a branching point of the first order, can be suppressed until the scanning beam meets upon at least a triple-valued branching point. In this way it is possible to prevent the shape elements from being repeated in the course of the evaluation process (please refer to the evaluation of the numeral "4" described with reference to FIG. 6).

Since the system of coordinates is assumed to be in an oblique position (see FIG. 1), one unambiguous point of the character having the greatest positive or negative $x$-coordinate will always result.

After having determined the starting point, the scanning of the character is inititaed by simultaneously registering the shape elements or the criteria thereof. To this end, the arrangement, as shown in FIG. 21 in schematic form, is used.

For the registering of the respective order of a branching point, it is only necessary to retain the above mentioned counting result, according to FIG. 11, and to convert this result into a digital form. This may be performed with the aid of conventional types of arrangements which are not particularly shown and described herein. The result is stored into the storage device 64 in a digital way.

The initial or starting direction of the shape elements can already be taken from the respective storage device 47 in a digital form, whereas the curvature of the shape element is likewise already digitalized by the condition or state of the two storage devices 55 and 56. Accordingly, in the case of each shape element, the storage device 64 in which the order of the respective branching point is stored in a digitalized fashion, as well as the storage devices 47, 55 and 56 are interrogated, and the results thereof are stored into the storage device 65 via the switches 67. In this way the storage devices 47, 55, 56 and 64 are available for ascertaining the next shape element.

After all shape elements have been ascertained, and after the corresponding criteria have been stored into the storage device 65, the outputs of this storage device are connected to the translator circuit 66 via the switch 68. The recognized character is indicated at the outputs of the translator 66 by way of marking one of the output leads.

For the purpose of obtaining a reduction of the digital expressions for the shape elements, it is possible to determine, prior to the comparison, either the total number of shape elements or the number of branching points of a certain order, and to use these statements for identifying the scanned character. Furthermore, it is also possible to admit only certain shape elements to the evaluation process, and to neglect the others. If there are several types used for indicating one and the same character (numeral, symbol, letter) as is often the case with letters or numerals (cf. FIG. 22), then each of these types of character embodiments has to be previously fixed or laid down in the translator 66. Appropriately, this circuit arrangement is of the type "capable of learning," that is, on account of the material of characters appearing in practical usage and which are difficult or incapable of being deciphered, the translator 66 is always supplemented or complemented in a digital fashion by providing new ways or forms of representing the respective characters.

After the character has been recognized, the scanning point is led to the so-called jump-off point and proceeds from there to the next character to be recognized.

All of the processes described hereinbefore are controlled with the aid of a centralized control device which may consist of conventional means and has not been shown in detail.

III. IDENTIFICATION OF NUMERAL FIVE

Having explained the general operation of the various circuits, a description of their operation in identifying the numeral 5 will now be given.

Figure 7:
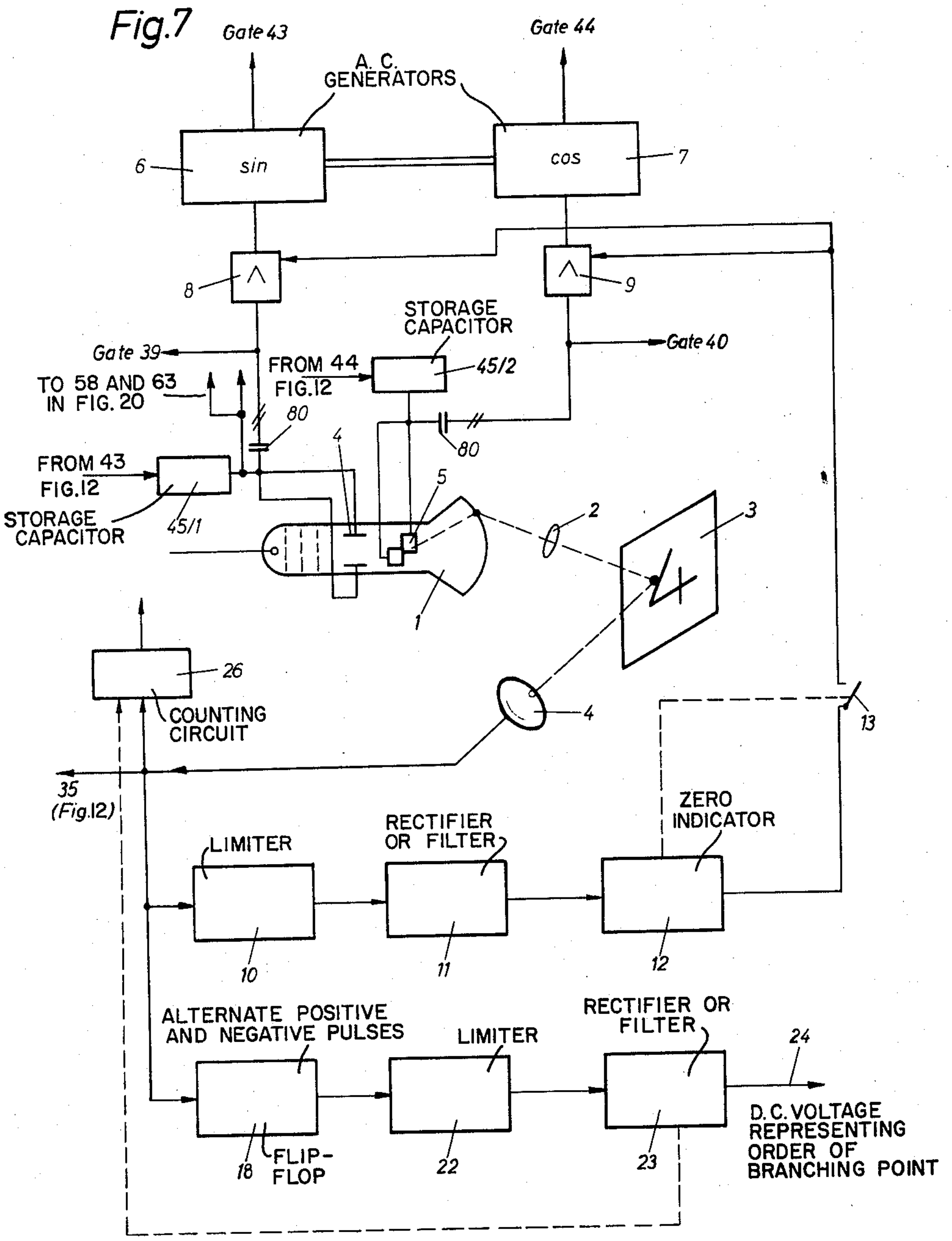
FIG. 7 shows the block diagram of the scanning device.

The light beam is moving in a small circle, as indicated in FIG. 8, under control of the sine generator 6 and cosine generator 7, shown in FIG. 7, acting on the deflection plates 4 and 5. By the application of a suitable voltage on the *y*-axis deflection plates, which has not been indicated on the drawings, the rotating beam is caused to move in the positive direction of the *y*-axis until it encounters some portion of the numeral 5.

Up to this time, the photoelectric cell 4 of FIG. 7 has merely been receiving reflected white light. However, when it strikes some part of the numeral 5, the light is cut off and a dark pulse is initiated. Then as the beam continues to rotate, a series of these dark pulses is produced at the photoelectric cell.

The production of these dark pulses does several things: It starts to enlarge the circle of rotation of the beam. It arrests the general direction of the beam and causes it to follow the line of the numeral 5, and it operates circuits which will eventually determine the order of the branching point, the starting direction from that point, and the kind of curvature of the space element, so that the numeral 5 can be identified.

These dark pulses pass into the limiter 10 and rectifier 11 to produce a voltage at the output of the zero indicator 12 which increases the gain of the amplifiers 8 and 9, so that the diameter of the circle of rotation of the beam starts to increase. When the circle becomes large enough so that the light pulses are the same length as the dark pulses, the zero indicator will produce a zero output. This will open the switch 13 and the gain of the amplifiers 8 and 9 will thereafter remain constant, so that the diameter of the circle of rotation will remain constant.

The output of the photocell 4 will also be fed to the differentiating circuit 35 of FIG. 12 to effect the change in the general direction of the beam which is determined anew for each rotation of the beam. A needle pulse 76 will be produced by the leading edge of each dark pulse at the differentiating circuit 35, and this will pass through the bistable gate 34 which is open. However, the pulse will close the gate 34 to prevent any other pulse 76 for that particular rotation of the beam from passing through. The pulse 76 is shifted by the phase shifter 36 to form a control pulse 77 which now represents, by its time position, the new general direction the beam is to take in following the contour of the numeral 5.

The pulse 77 opens the AND gates 37 and 38 for an instant, allowing the voltage values of the sine and cosine generators 6 and 7 at that instant to pass into the intermediate storage devices 41 and 42, respectively, from which these values pass into the short-time storage devices 27 and 28. In the mean time, the sine and cosine generators continue to operate and the voltages produced thereby are compared in the amplitude coincidence devices 30 and 31 with the voltages in the short-time storage devices 27 and 28. When coincidence is found, these circuits produce a pulse, and when both produce pulses at the same time, the coincidence circuit 32 passes a pulse which is shifted through 180° to open the gate 34 for the next pulse 76.

At the time of the first pulse 76, the AND gates 39 and 40 are opened to pass the instantaneous values from the generators 6 and 7 to the deflection storage devices 45/1 and 45/2 which will control the general direction of the beam. This cycle repeats for each rotation of the beam, so that its general direction is caused to follow the contour of the numeral 5.

No evaluation takes place until the most positive point in the *x*-coordinate has been determined. Thus, the beam will follow the contour of the numeral 5 in a counterclockwise direction at least once before the start signal is produced. This is accomplished by the circuit of FIG. 20, where the sequence of instantaneous values from the *x*-coordinate storage device 45/1 is filtered out by the filter 58 and fed into a maximum storage device 59. When the voltage in this device goes no higher, this will correspond to the point A in FIG. 5, and this voltage will be compared in the comparator 63 with the sequence of voltages from the storage device 45/1. When the two are the same, the center of the beam will be at the point A of the figure, and the start signal will be given which closes the switches for the storage device 65 of FIG. 21 to receive the information for making the evaluation.

At the point A of the numeral 5, the order of the branching point will be stored in the storage device 64 of FIG. 21. The order of this point will be determined by the circuits 18, 22, and 23 of FIG. 7. The bright pulses from the photoelectric cell 4, as the beam rotates about point A, cause the flip-flop 18 to produce alternate positive and negative voltages which when rectified in the rectifier 23 produce a D.C. voltage which then will represent the first order, the end of a line. This will be transferred from the rectifier 23 of FIG. 7 to the order storage device 64 of FIG. 21. This will be represented by the digit "1."

The direction that the space element will take as the beam travels around the lower loop of the numeral 5 will now be registered in the quadrant storage device 47 of FIG. 21. This will be obtained by the circuit of FIG. 16. The pulses 77 from the phase shifter 36 of FIG. 7 are fed to the AND gates 46/1 to 46/4 of FIG. 16. These gates are enabled in succession as the beam travels through the four quadrants by the phase shifter which receives the sine wave from the sine wave generator 6. The timing of the pulse 77 will identify the quadrant, since the pulse corresponds to the center of the line which the beam is following. The beam, after leaving the point A of the numeral 5, is travelling towards the first quadrant, and hence the AND gate 46/1 will pass the pulse to the storage device 47/1 from which it will be transferred to the storage device 65.

The shape of the curve of the lower part of the numeral 5 will be determined by the circuit of FIG. 18. The AND gate 51 is opened by the pulse 77 from the phase shifter 36 of FIG. 7 and permits the passage of an instantaneous value of the sawtooth wave of the generator 49 which corresponds to the particular angle through which the beam is passing at the time. This value is subsequently passed through the AND gate 80′ to the auxiliary storage device 53. The next pulse 77 will send another value of the sawtooth wave into the storage device 52, representing a new direction of the beam. Since the beam is travelling around the positive curve of the numeral 5, this new voltage in the storage device 52 will be greater than the value stored in the storage device 53, and the comparator 54 will produce a positive output which will energize the counter 55. Because the line continues with the same curvature, repeated pulses will build up in the counter 55. The output of this counter will be transferred to the storage device 65 as the digit "2" to represent the positive curvature of the lower part of the numeral 5.

All the information for the first branching point of the numeral 5 has now been stored as the three digit number 112.

The next branching point is shown at C, and, since this is a bend in the line, it is a branching point of the second order. Accordingly the D.C. output of the rectifier 23 of FIG. 7 will have a value corresponding to the second order, because now the asymmetry of the bright spots will thus alter the output of the rectifier 23. This voltage will be delivered to the storage device 64 of FIG. 21 and will be registered there as the digit "2."

The quadrant into which the line of the numeral is moving is the third quadrant, and the circuit of FIG. 16 will cause the storage device 47/3 to send its signal to the storage device 65 of FIG. 21, it being understood that all the storage devices 47/1 to 47/4 will be connectable to the storage device 65.

The shape of the space element from the point C is a straight line, and hence neither of the counters 55 and 56 will be energized, which will cause the transfer of a 1 to the storage device 65 of FIG. 21.

The second branching point C of the numeral 5 has now been identified by the number 231 which has been registered in the storage device 65 of FIG. 21.

The beam now moves to the next branching point D which is also a bend, followed by a straight line. The circuit of FIG. 7 will now transfer a voltage from the rectifier 23 of that figure to the storage device 64 of FIG. 21, representing the second order of branching points, namely a "2."

The circuit of FIG. 16 will register a 2 by the operation of the storage device 47/2 in the same manner as for the last branching point.

The circuit of FIG. 18 will ascertain that the shape of the upper part of the numeral 5 is a straight line which is represented by a "1," and this will be registered by means of the counter 55, in a similar manner as already described.

Thus, the three digit number for the last branching point of the numeral 5 will be 221, which will be registered in the storage device 65 of FIG. 21.

With all the information necessary for the identification of the numeral 5 in the storage device 65, it can be translated by means of any suitable translator 66 into the numeral 5 by energizing the fifth outlet lead, for example.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. Apparatus for performing the automatic scanning of characters, in particular of printed characters, in which the scanning is effected along the characters, and for evaluating the scanning results in order to identify the scanned character, comprising:

means for scanning the character along a path from a fixed starting point on the character along the contours of the character;

means for detecting a branching point;

means responsive to the detection of said branching point to cause the scanning to continue along the next successive shape element of the character in accordance with a previously fixed selectable order of succession until the whole character is scanned;

means responsive to the scanning operation for producing electrical signals respectively characterizing the order of the branching point, the direction at the beginning of every shape element, and the curvature of the said shape elements; and means for utilizing at least two of the above properties for identifying the scanned character.

2. Apparatus, according to claim 1, in which, upon reaching a branching point, the scanning means is adapted to continue scanning on that particular shape element which, in a mathematically positive sense, is lying closest to the path of scanning on approaching the branching point.

3. Apparatus, according to claim 2, in which the scanning means comprises a scanning beam of radiation and means for moving said beam in a step-by-step manner with a superimposed rotational movement, in the course of which the size of the steps is equal to the radius of the scanning circle.

4. Apparatus, according to claim 3, in which the scanning means further comprises means operative when the scanning operation is between two characters for causing the diameter of the scanning circle to be smaller than the smallest width of the character lines to be expected, and means for causing said scanning circle, when meeting upon a character, to automatically widen out in such a way that the circular arc which is covered by the line of the character, is approximately equal, to the circular arc not covered by the line of the character whenever the centre of the scanning circle is lying approximately in the middle of the line of the character.

5. Apparatus, according to claim 4, further comprising means for releasing the automatic expansion of the scanning circle said means being responsive to the first dark pulse appearing when the character is hit by the scanning beam.

6. Apparatus, according to claim 5, in which the scanning means comprises cosine wave and sine wave generators for causing rotation of the beam, and in which the means responsive to the scanning operation comprises a photoelectric cell adapted to receive reflected radiation from the field of the character, means for converting the output signals of the photoelectric cell into a rectangular voltage, means for rectifying this voltage, means for utilizing the direct-current component from said rectifying means in such a way for the amplitude regulation of the cosine and sine wave generators producing the rotational voltage of the scanning beam, that the direct-current component proceeds towards zero, whereupon the amplitude regulation is suppressed.

7. Apparatus, according to claim 1, in which the scanning means comprises a beam of radiation and cosine and sine wave generators for causing rotation of said beam, and in which the means responsive to the operation of the scanning means comprises a photoelectric cell adapted to receive reflected radiation of said beam from the field of the character, and means for ascertaining the order of the branching point under consideration, comprising means responsive to the the number of dark pulses appearing during one rotation of the scanning beam.

8. Apparatus, according to claim 1, in which the scanning means comprises a beam of radiation and cosine and sine wave generators for causing rotation of said beam, and in which the means responsive to operation of the scanning means comprises a photoelectric cell adapted to receive reflected radiation of said beam from the field of the character, and means for distinguishing between a normal point of the line and a branching point of the second order and responsive to the symmetry of the dark pulses appearing in both cases upon one rotation of the scanning beam, for converting the first, the third, the fifth, etc. bright impulse from said photoelectric cell into a negative pulse, and the second, fourth, etc. bright impulse into a negative pulse, and means for determining the asymmetry by the direct-current component of the rectangular alternating current produced in this way.

9. Apparatus, according to claim 1, in which the scanning means comprises a beam of radiation and cosine and sine wave generators for causing rotation of said beam, and in which the means responsive to the operation of the scanning means comprises a photoelectric cell adapted to receive reflected radiation of said beam from the field of the character, and means for determining the new direction of steps comprising short-time storage means for storing the sine and cosine value, which are delivered by the generators and correspond to the direction of the last step, coincidence circuit means operative during one rotation of the scanning beam for continuously comparing the two stored values with the momentary values of the generators and for delivering an output signal if two equal voltages are applied at their inputs a further coincidence circuit, means for applying said two output signals to said further coincidence circuit, so that third output signal is produced if the momentary position of the scanning point on its circular path coincides with the original direction of the last step, means for shifting said third output signal by 180°, a bistable gate, and means for applying said shifted output signal to said gate to open said gate and filter out the pulses produced by the photoelectric cell during the rotation of the scanning beam.

10. Apparatus according to claim 9, in which the means responsive to the scanning means further comprises differentiating means for differentiating the output signals of the photoelectric cell, and means for applying the differentiated signal of the leading edge of the output signal, via the bistable gate, to the phase shifting means.

11. Apparatus, according to claim 10, in which the means responsive to the scanning means comprises means for adjusting the scanning beam to the new center of the circle, comprising a pair of scanning storage devices, one for each deflecting circuit for the beam, a pair of intermediate storage devices, means for connecting the outputs of said intermediate storage devices respectively to said scanning storage devices, first and second AND gates having their outputs connected respectively to said intermediate storage devices, means for feeding the output pulse of the phase shifting means to said first and second AND gates as an opening pulse, amplifying means for connecting the sine and cosine generating means respectively to inputs of said first and second AND gates, whereby the sine and cosine values of said generators are applied to the intermediate storage devices and the values of the storage devices serve to adjust the scanning beam in that they are added to the values already stored in the scanning storage devices.

12. Apparatus, according to claim 9, in which the means responsive to the scanning means for determining the new direction of step upon reaching a branching point, comprises a counting circuit connected to the output of the photoelectric cell, and means responsive to the operation of said counting circuit for altering the operation of said phase shifting means by 90° for a branching point of a first order, by 45° for one of a second order, by 30° for one of a third order, and by 22.5° for one of a fourth order.

13. Apparatus, according to claim 1, in which the scanning means comprises a beam of radiation and cosine and sine wave generators for causing rotation of said beam, and in which the means responsive to the operation of the scanning means comprises a photoelectric cell adapted to receive reflection radiation of said beam from the field of the character, and means connected to the output of said photoelectric cell for determining the direction of a shape element, said means comprising means controlled by dark pulses from said photoelectric cell for producing a control pulse at a time in the rotation of said beam corresponding to the direction of movement of the center of the circle of rotation of said beam, four AND gates, assigned respectively to the four quadrants of the rectangular coordinate system representing the field of said character, four quadrant storage devices connected respectively to the outputs of said four AND gates, and phase shifting means connecting the output of said sine wave generator with the secondary inputs of said AND gates, so as to enable each of said gates during the assigned quadrant, whereby the output signal of the particular AND gate which is enabled when the control pulse is applied thereto is stored in the associated quadrant storage device.

14. Apparatus, according to claim 13, in which the phase shifting means between the output of the sine wave generator and the secondary inputs of the said gates is adapted to shift the phase of the output voltage of the sine wave generator by a fixed amount, if said control pulse occurs at the boundary between two quadrants.

15. Apparatus, according to claim 1, in which the scanning means comprises a beam of radiation and cosine and sine wave generators for causing rotation of said beam, and in which the means responsive to the operation of the scanning means comprises a photoelectric cell adapted to receive reflected radiation of said beam from the field of the character, and means connected to the output of said photoelectric cell for determining the curvature of a shape element, said means comprising means controlled by dark pulses from said photoelectric cell for producing a control pulse at a time in the rotation of said beam corresponding to the direction of movement of the center of the circle of rotation of said beam, a saw-tooth generator, means for controlling said saw-tooth generator by said sine wave generator, so that during the circular rotation of the scanning beam, a saw-tooth wave is produced, an AND gate having one input connected to said saw-tooth generator, a storage device connected to the output of said AND gate, means for applying said control pulse to said AND gate as a gate opening pulse, so that at the time position when the scanning beam has a new direction, the momentary voltage of the saw-tooth generator is stored in said storage device, an auxiliary storage device, means operative prior to the next rotation and controlled by said control pulse for comparing the voltage in said auxiliary storage device with the voltage in said storage device, a positive pulse counter and a negative pulse counter, both connected to said comparing means, said comparing means adapted to deliver a negative or positive output signal to said counters if the voltage stored in said storage device is either smaller or greater than that stored in said auxiliary storage device, whereas no readout is effected if both voltages are alike, and means, operative subsequently to the comparison, for transferring the voltage stored from said storage device to said auxiliary storage device for effecting the next comparison.

16. Apparatus, according to claim 1, in which the means responsive to the scanning operation comprises means for dividing the electrical signals identifying the three criteria into four digital values with respect to each criterion, and comprising means for designating the first criterion, which is the order of the branching point, by the digits 1 to 4, representing, respectively, ends of line, bends of line, branching of lines, and crossing lines, means for designating the second criterion, which is the quadrant of the four quadrant system of coordinates into which the shape element under consideration extends from the branching point, by the digits 1 to 4, and means for designating the third criterion, which is the shape of the shape element, by the digits 1 to 4, representing, respectively, not bent, mathematically positively bent, mathematically negatively bent, and changing, whereby the individual shape element is characteristized by a triple figure, and the characters are characteried by several triple figures.

17. Apparatus, according to claim 1, further comprising means, operative prior to the actual evaluation, for ascertaining both the fixed starting point and the jumping-off point by causing the scanning path to encircle the character at least once.

18. Apparatus, according to claim 17, further comprising maximum and minimum storage devices, and means for fixing the starting point as a maximum positive $x$-value in an $x-y$ corrdinate field, and the jumping-off point as a maximum negative $y$-value, and means for storing the respective values in said maximum and minimum storing devices, so that the maximum values can be determined.

19. Apparatus, according to claim 1, further comprising shape-element-criteria storage means, means for storing the shape-element criteria, which are ascertained from the starting point, in said storage means, a comparator translator, and means for transferring said criteria from said storage means to said comparator, whereby they then may be compared with the criteria of the normal characters stored therein.

20. Apparatus, according to claim 19 in which the said comparator translator is adapted to be capable of learning, so that on account of the character material accruing in the course of the practical usage, and which is incapable of being deciphered, the criteria of the new characters, stored in a digital form into the comparator, may be identified.

References Cited by the Examiner

UNITED STATES PATENTS

| | | | |
|---|---|---|---|
| 2,980,332 | 4/1961 | Brouillette et al. | 340—146.3 |
| 2,986,643 | 5/1961 | Brouillette. | |
| 2,988,643 | 6/1961 | Inaba. | |
| 3,074,050 | 1/1963 | Schutz | 340—146.3 |

FOREIGN PATENTS

| | | |
|---|---|---|
| 233,210 | 5/1959 | Australia. |
| 628,449 | 10/1961 | Canada. |

MALCOLM A. MORRISON, *Primary Examiner.*

DARYL W. COOK, *Examiner.*